Patented Oct. 30, 1923.

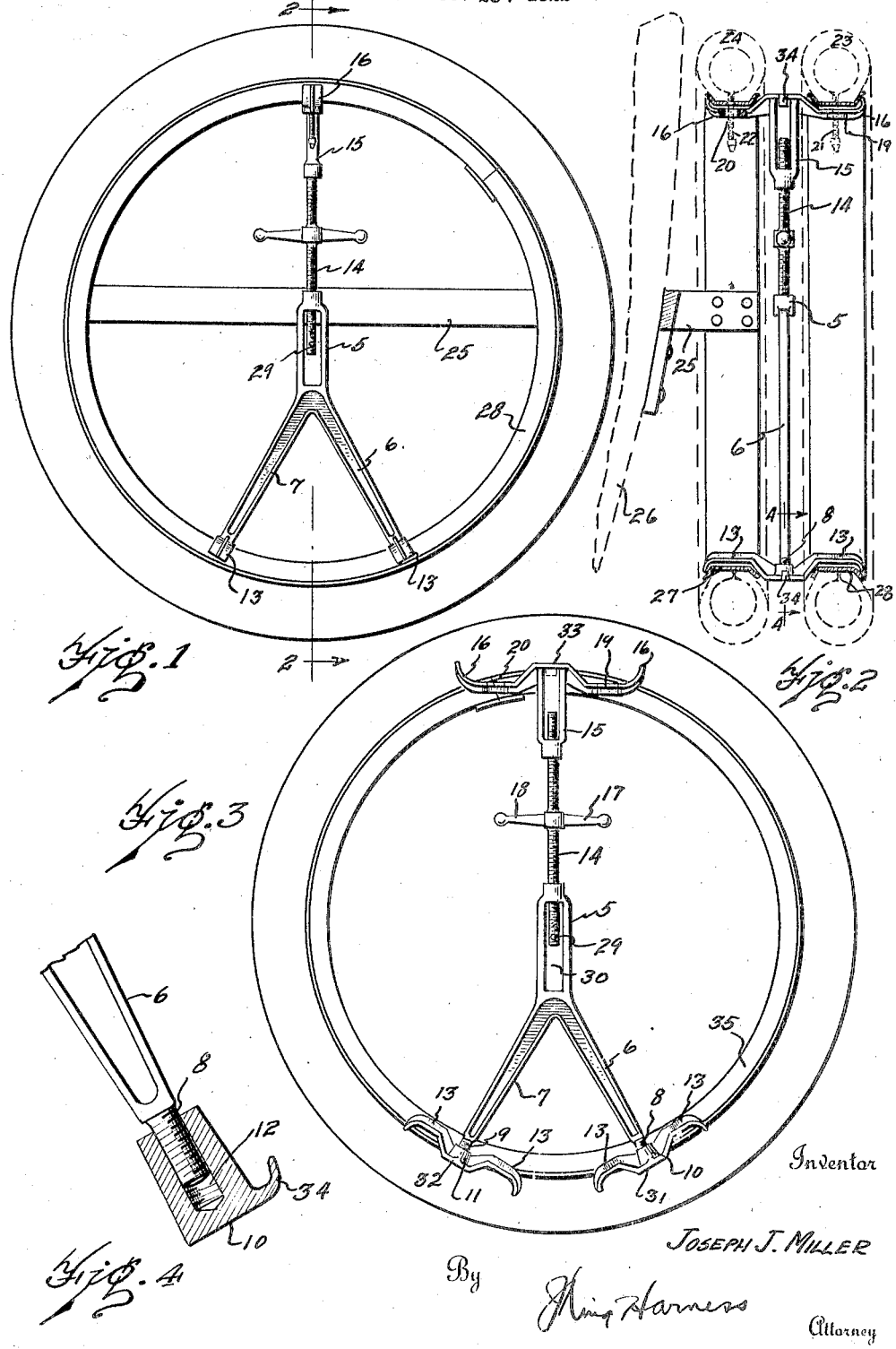

1,472,130

UNITED STATES PATENT OFFICE.

JOSEPH J. MILLER, OF HIGHLAND PARK, MICHIGAN.

COMBINED TIRE CARRIER AND RIM TOOL.

Application filed December 28, 1922. Serial No. 609,539.

*To all whom it may concern:*

Be it known that I, JOSEPH J. MILLER, a citizen of the United States, and resident of the city of Highland Park, county of Wayne, and State of Michigan, have invented certain new and useful Improvements in Combined Tire Carriers and Rim Tools, of which the following is a specification, reference being had to the accompanying drawings.

It is the primary object of my invention to provide a device adapted to be secured to the automobile tire carrier such as is provided with the ordinary automobile, or to the rim of a spare tire which is ordinarily carried on an automobile, whereby provision is made for the carrying of at least one additional spare tire.

It is a further object of my invention to provide such a device capable of being utilized as a rim spreader or contractor for the purpose of taking on or off tires from a wheel rim.

It is a further object of my invention to provide such a device of cheap and economical construction and which may be utilized with the greatest of ease and comfort by the motorist.

With these and other objects in view, my invention consists in the arrangement, combination and construction of the various parts of my improved device as described in the specification claimed in my claims, and showing the accompanying drawings, in which:

Fig. 1 is a rear elevation of my improved device as mounted on the rear of an automobile.

Fig. 2 is a sectional view taken on line 2—2 of Fig. 1.

Fig. 3 is a plan view of my improved device showing the method of using the same as a rim contractor.

Fig. 4 is a sectional view taken on line 4—4 of Fig. 2.

In the construction of my improved device, I provide a central portion 5, having arms 6 and 7 extending therefrom, in a somewhat V shaped formation. The arms 6 and 7 are screw threaded on their ends at 8 and 9 respectively, whereby members 10 and 11 may be screwed thereon through the screw threaded apertures 12.

The members 10 and 11 are provided each with a pair of oppositely extending rim engaging portions 13.

The member 5 is apertured and centrally screw threaded at its upper end whereby a screw threaded rod 14 may be passed therethrough. The screw threaded rod engages at its upper end with a member 15 through a screw threaded opening therein. The member 15 is likewise provided with a pair of oppositely extending rim engaging portions 16.

The rod 14 is provided intermediate its ends with a handle consisting of oppositely extending arms 17 and 18, whereby the said rod may be rotated with ease.

The members 16 are each provided with a pair of apertures 19 and 20 adapted to permit the passage therethrough of valve stems 21 and 22 respectively, from the tires 23 and 24.

It will thus be seen that when it is desired to utilize my improved device for the purpose of carrying a second spare tire, it is placed in position as is more particularly shown in Fig. 2 directly in the rear of the usual spare tire 24 carried on the tire carrier 25, attached to the vehicle back 26, with one of the rim engaging portions 16 and likewise one of the rim engaging portions 13 from both the members 10 and 11 engaging the rim 27 of the usual spare tire.

A second spare tire may then be placed in position with its rim 28 engaging the remaining portions 13 and 16, and the rod 14 rotated by means of the arms 17 and 18 so as to cause the distance between the members 5 and 15 to be lengthened, and thus cause the rigid engagement of the rim engaging portions 13 and 16, with both the usual spare tire and the second spare tire.

It will be noted that the member 5 is provided with a slot 30 so that the rod 14 may have a free movement throughout the length of the member 5, and also so that the carrier may be locked against thievery by passing a padlock through the aperture 29 provided in the end of rod 14 and around one of the sides of the portion 5 in such a manner that the padlock will entirely encircle the said side of the member 5, as well as pass through the said opening in the rod 14.

When it is desired to utilize my improved device as a rim expander, the flattened ends 31, 32 and 33 of the members 10, 11 and 15, respectively, are placed abutting the inner face of the rim, and the rod 14 is rotated through the arms 17 and 18, so as to lengthen the distance between the portions 31 and 32 and the portion 33.

When it is desired to utilize my improved device as a rim contractor, the hook like members 34, which are provided on each of the members 10 11 and 15, are placed over the edge of the tire rim 35, and the rod 14 rotated so as to lessen the distance between the members 5 and 15, and thus draw inwardly the portion of the rim near where the same is split. The best results will be obtained by placing the hook like portion 34 provided on the member 15 adjacent the split portion of the rim, rather than the said member on either of the members 10 or 11.

It will be noted of course that in order to utilize my improved device for these different purposes, it is sometimes necessary when changing from one use to the other to rotate the members 10, 11 and 15 a half turn on the screw threaded ends 8 and 9 of the arms 6 and 7, and the screw threaded end of the rod 14 respectively. This, however, is very simple.

It will thus be seen that I have provided a simple and compact device adapted to function in a number of different ways and with the minimum of exertion upon the part of the user.

It will be obvious that various changes may be made in the arrangement, combination and construction of the various parts of my improved device without departing from the spirit of the invention, and it is my intention to cover by my claims such changes as may be reasonably included within the scope thereof.

What I claim is:

1. A device of the class described, comprising a central member, arms extending therefrom and having screw threaded extremities, rim engaging members adapted to be screwed on said extremities and means for raising and lowering at least one of said arms to thereby increase or decrease the span of said rim engaging members, hooks being provided on the sides of said rim engaging members whereby they may be turned sidewise and secured to the edge of a rim portion to contract the same when the span of said rim engaging members is lessened.

2. In a device of the class described, and in combination a central member having a pair of radially extending arms on its one end and a screw threaded aperture on its other; a bar screw threaded into said aperture and having on its other end an oppositely inclined-spiral screw thread; an arm screw threaded upon said last mentioned end of the screw threaded bar; a hand lever rigidly fixed near the middle of said bar; double concave clasps adapted to fit the inner periphery of an automobile tire rim attached to the extreme outer end of said arm and similar clasps screw threaded upon each end of said radially extending arms; one of said pairs of concave clasps apertured to receive the air valves of automobile tires; a flat portion between each of said pairs of clasps adapted to engage portions of the inner periphery of an automobile tire rim and inwardly clawed hooks on the sides thereof adapted to clutch the lips of such a rim.

JOSEPH J. MILLER